United States Patent [19]

Higgins

[11] Patent Number: 4,919,446
[45] Date of Patent: Apr. 24, 1990

[54] AUTOMATIC BOAT-TRAILER LOCKING ASSEMBLY

[76] Inventor: Carl Higgins, 2029 Spicewood, Bedford, Tex. 75021

[21] Appl. No.: 245,331

[22] Filed: Sep. 16, 1988

[51] Int. Cl.$^5$ .................................................. B60P 3/10
[52] U.S. Cl. .................................. 280/414.1; 414/529; 414/536
[58] Field of Search ...................... 280/414.1; 114/344; 414/536, 529; 292/335

[56] References Cited

U.S. PATENT DOCUMENTS

| | | | |
|---|---|---|---|
| 3,938,829 | 2/1976 | Anderson | 280/414.1 |
| 3,989,267 | 11/1976 | Robinson | 280/414.1 |
| 4,114,920 | 9/1978 | Boettcher | 280/414.1 |

Primary Examiner—Mitchell J. Hill
Attorney, Agent, or Firm—John M. Cone

[57] ABSTRACT

An automatically operating boat locking assembly includes a spring-loaded bolt which engages through the bow eye of a boat to secure the boat on a trailer and which can be withdrawn to free the boat for removal from the trailer. The bolt can be rotated in its withdrawn position to engage a portion of a frame of the assembly which prevents return of the bolt to the extended locking position. A trigger member carried by a frame of the locking assembly is contacted by the bow eye of the boat as the boat approaches the trailer and rotates the bolt whereupon the spring associated therewith returns the bolt to the locking position, through the bow eye locking the boat on the trailer.

8 Claims, 3 Drawing Sheets

AUTOMATIC BOAT-TRAILER LOCKING ASSEMBLY

BACKGROUND OF THE INVENTION

The present invention relates to an automatic locking assembly for securing a boat to, e.g., a trailer. It is conventional to provide a metal eye on the bow of a boat, usually on the center line of the boat and above its waterline, and the locking assembly of this invention is designed to secure the boat by means of the bow eye.

SUMMARY OF THE PRIOR ART

The prior art includes various locking assemblies for securing boats to trailers. U.S. Pat. No. 4,114,920 (Boettcher) and U.S. Pat. No. 3,989,267 (Robinson) disclose essentially similar assemblies in which a bow eye is fastened by a snap bolt mounted on the trailer frame. The bolt can be manually withdrawn to allow the boat to be launched from the trailer. After the bolt is withdrawn a trigger flap of the locking assembly is moved into a position in which it obstructs return movement of the bolt. When the boat is returned to the trailer, the bow eye pushes on the flap, moving it out of its obstructing position and allowing return of the bolt.

In Robinson the bolt is manually withdrawn from the bow eye using a handle and must be held in a withdrawn position to allow the boat to be removed from the trailer.

In both Boettcher and Robinson the mechanism is such that in turbulent water, where the boat during loading will move vertically with respect to the trailer, the lack of any means to guide the boat into the correct position with respect to the locking assembly is likely to cause malfunction and jamming of the assembly.

U.S. Pat. No. 3,938,829 (Anderson) discloses a latching device for securing a boat on a trailer and is designed to operate with an elongated eye fixed to the boat bow. This type of eye is no longer commonly manufactured or fitted to boats. In use, a spring loaded movable latch, having a curved leading edge, is depressed by the elongated eye and forced sideways until the eye can pass the latch, which then returns under spring biasing means to secure the eye. The latch can be held in a withdrawn position by a pawl, or by means of a pin and registering openings on the latch and its housing, but cannot be automatically released from the withdrawn position when the bow eye contacts the latch.

SUMMARY OF THE INVENTION

The present invention provides a boat latching assembly for securing a boat by means of, e.g. a bow eye, to a trailer. The present invention allows both unloading and loading of the boat by only one person and avoids the need for manual operation of the assembly during loading or unloading.

According to the present invention there is provided a locking assembly for securing a boat to a trailer by means of the boat's bow eye comprising: a frame mounted on the trailer and carrying a bolt which is movable between a locking position in which it engages, in use, through a bow eye of a boat securing the boat on the trailer and a withdrawn position in which the boat can be removed from the trailer; biasing means urging the bolt towards the locking position; means for restraining the bolt in the withdrawn position; trigger means for releasing the bolt from the restraining means to allow it to move toward the locking position; said trigger means comprising a member on the frame movable from a set position, in which it can be contacted by the bow eye of the boat as the boat is loaded on the trailer to release the bolt.

DESCRIPTION OF THE PREFERRED EMBODIMENT

Figure 1:
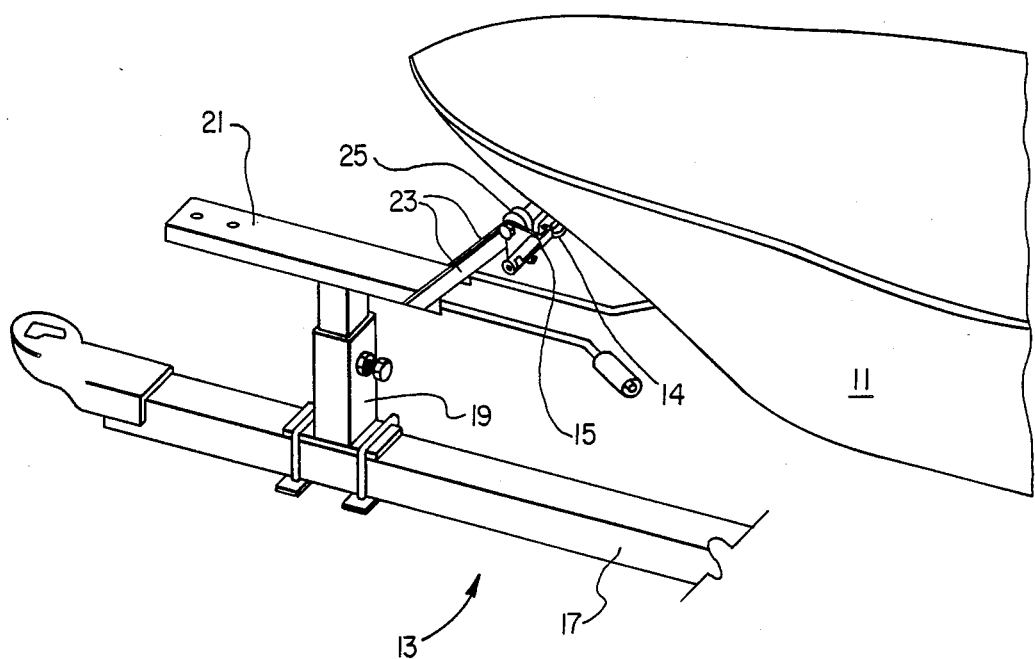
FIG. 1 is an isometric view of a latching device embodying the present invention and used to secure a boat to a trailer.
Figure 2:
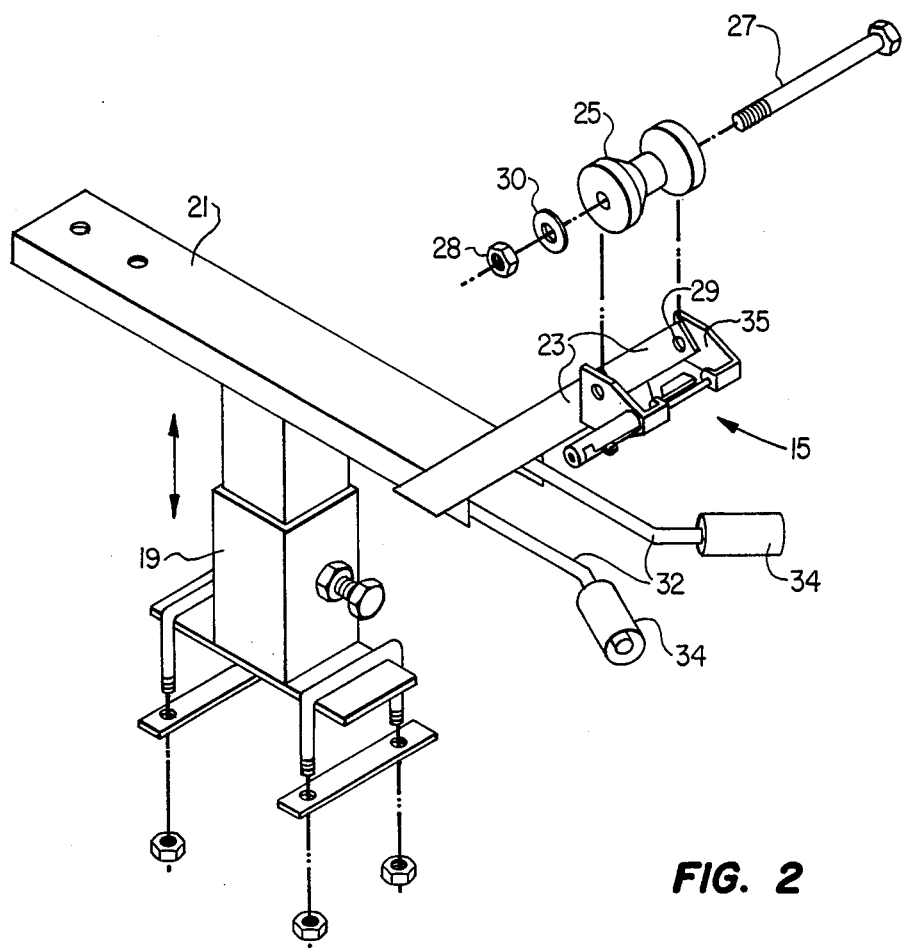
FIG. 2 is an isometric view, partly exploded, of the device shown in FIG. 1.

As best seen in FIG. 1, a boat 11 is secured to a trailer 13 by means of a locking assembly 15 provided on the trailer 13 which secures through a bow eye 14 of the boat. The trailer 13 includes a main horizontal frame 17 from which extends an essentially vertical, post 19, the height of which can be adjusted in a manner well known in the art. On the upper end of the post 19 is a horizontal frame member 21 extending longitudinally of the trailer 13. At one end of the frame member 21, two spaced apart flat bars 23 extend upwardly at approximately 45° to the horizontal. Between the upper ends of the bars 23, as best seen in FIG. 2, is disposed a rubber roller 25 rotatably mounted on a bolt 27 which extends through registering apertures 29 in the bars 23 and is secured by a nut 28 and washer 30. A pair of outwardly flared guide members 32 with padded ends 34 extend from the frame member 21 and, in use, channel the boat into the correct position to bring the eye 14 into engagement with the locking assembly 15.

The parts described above are conventional in boat trailer construction. The locking assembly 15 of the present invention is designed to be mounted on the bars 23 adjacent the roller 25 and can thus be retrofitted to many existing trailers.

Figure 3:
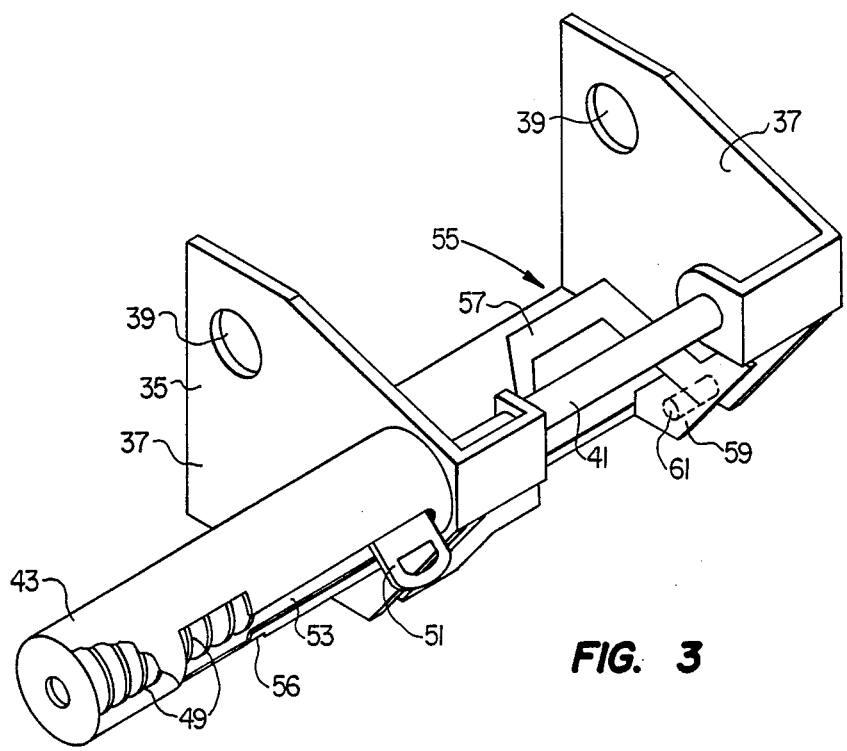
FIG. 3 is an isometric view of the latching device of FIG. 1 and 2, shown apart from the boat trailer.

The locking assembly 15 comprises a U-shaped frame 35, best seen in FIG. 3. The frame 35 includes arms 37 which extend around the outside of the bars 23 and which are apertured at 39 to receive the bolt 27 which mounts the frame 35 on the bars 23 and allows rotation of the frame 35 about an essentially horizontal axis.

Figure 4:
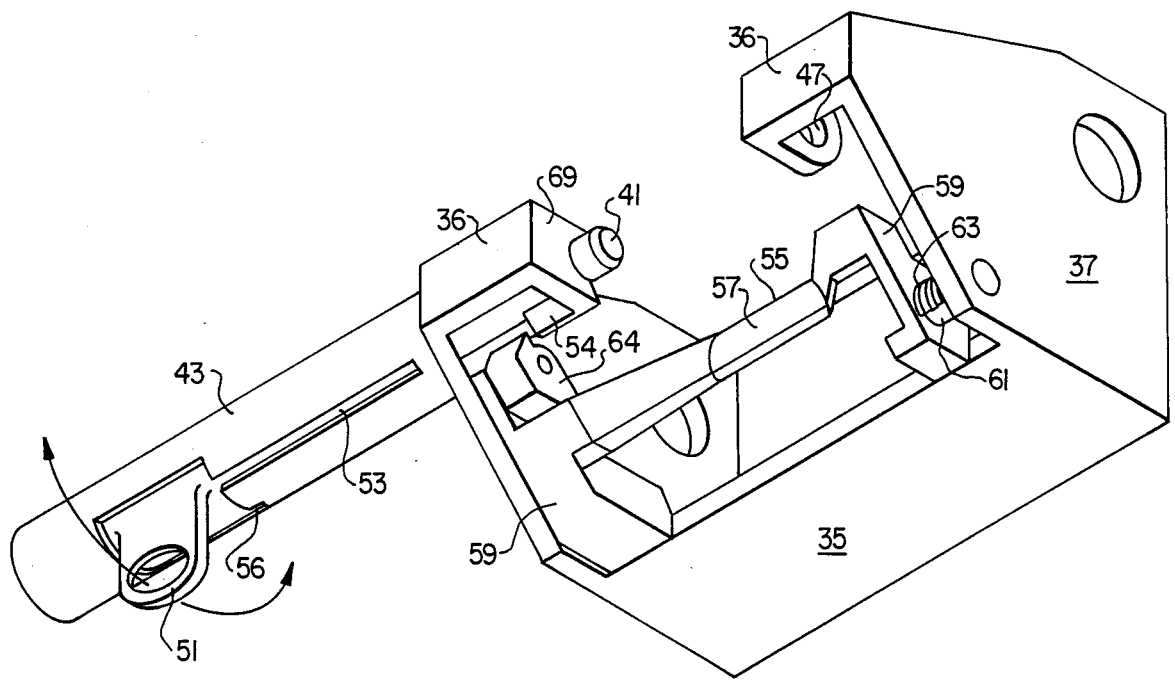
FIG. 4 is an isometric view of the device shown in FIG. 3.

On the left side of the frame 35, as viewed in FIG. 3, is a bolt 41 which is slideably accommodated within a cylindrical housing 43, mounted on the left arm 37 of the frame 35 and extending perpendicular to the arm 37. The bolt 41 is movable between a withdrawn position in which it is substantially entirely withdrawn within the housing 43, as seen in FIG. 4, and an engaging position, best seen in FIG. 3, in which it is extended from the housing 43 and engaged through two, inwardly directed, L-shaped extensions 36 of the respective arms 37 of the frame 35, through each of which extensions has an opening 47, through which the bolt 41 passes when extended. Engagement of the bolt 41 through the arm 37 in the extended position of the bolt 41 provides rigidity and strength to the assembly.

A compression spring 49 is provided within the housing 43 and acts to bias the bolt 41 outwardly from the housing 43. A handle 51 for the bolt 41 extends through a slot 53 in the wall of the housing 43. At its end remote from the handle 51, the bolt 41 has a radially extending flange 54. When the bolt 41 is withdrawn into the housing 43, rotation of the bolt 41 in the clockwise direction, as seen in FIG. 3, positions the flange 54 behind a return portion 69 of the arm 37, preventing return of the bolt 41.

As best seen in FIG. 4, the housing 43 includes a second, short slot 56 parallel to but spaced from the slot 53. After withdrawal, the bolt 41 can be rotated counter-clockwise, as seen in FIG. 3, sufficiently to bring the handle 51 into alignment with the slot 56. The handle 51 can then be inserted into the slot, preventing return of the bolt 41.

Pivotally mounted between the arms 37 of the frame 35 is a trigger member 55, best seen in FIG. 4. The trigger member 55 includes a center portion 57 and two side portions 59 at which the trigger member 55 is pivotally mounted to the frame 35 by shafts 61 seen best in FIG. 4. A spring 63 surrounds one of the shafts 61, see FIG. 4, and acts between the frame 35 and the trigger member 55 to urge the trigger member 55 to rotate about the shaft 61 in an anti-clockwise direction as seen in FIG. 5-8.

Figure 5:
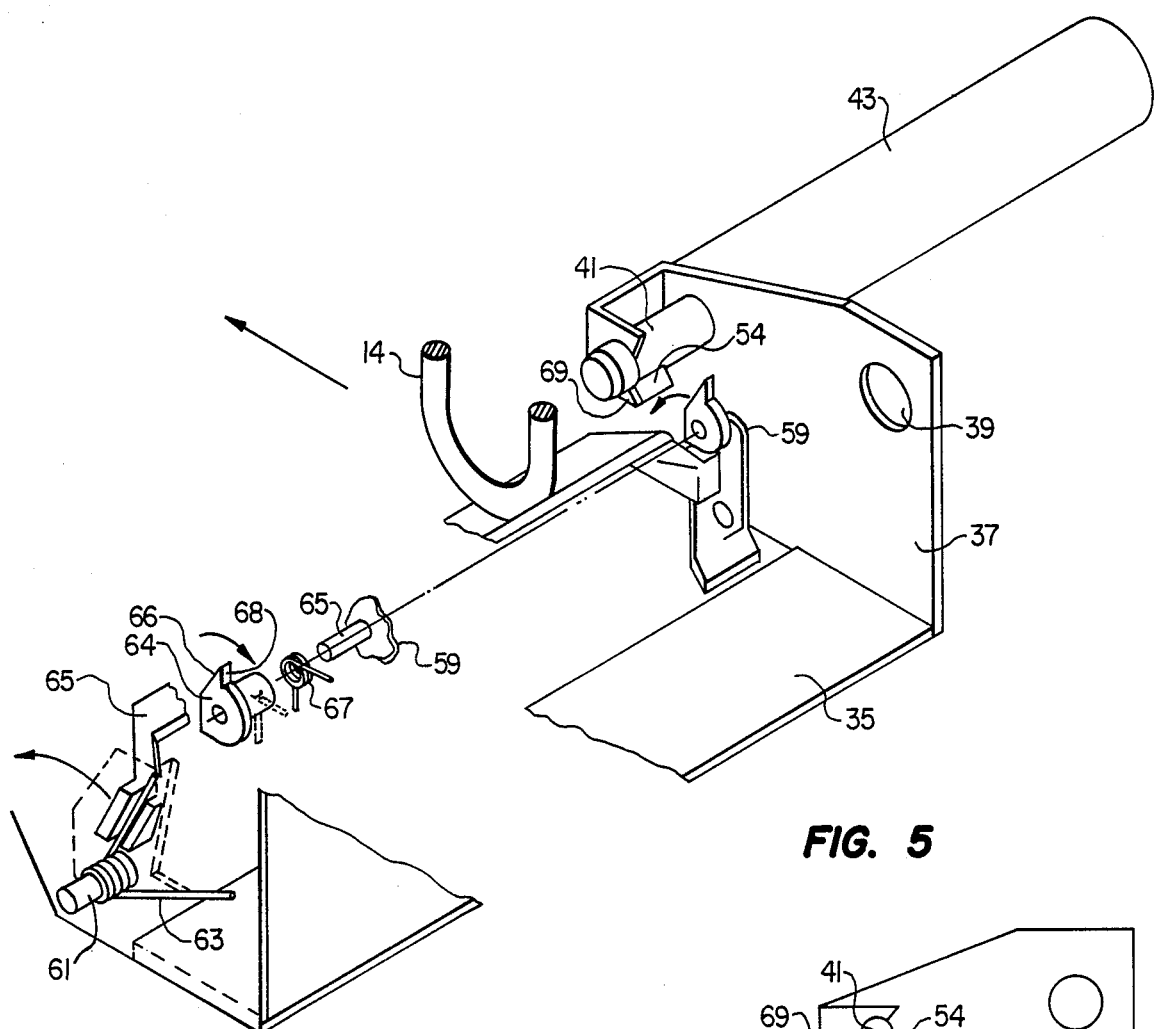
FIG. 5 is an isometric view of the latching device shown in FIG. 3 with certain parts shown also exploded to reveal interior detail.

At its side portion 59 adjacent to the bolt 41, the trigger member 55 carries a cam 64, which is rotatably mounted on the member 55 by a shaft 65 and is biased to rotate about the shaft 65 in a clockwise direction, as seen in FIG. 5, by means of a spring 67. The cam includes a ramped cam surface 66 and a ratchet tooth 68.

FIG. 3 shows the locking assembly 15 in the locking position in which it secures the boat on the trailer 13 by engagement of the bolt 41 through the bow eye 14 of the boat. To remove the boat from the trailer, the bolt 41 is grasped by the handle and withdrawn axially into the housing 43. When the bolt 41 is fully withdrawn it is rotated so that the flange 54 engages behind the return portion 69 of the arm 37 of the frame 35, as seen in FIGS. 4 and 5. The engagement of the flange 54 behind the return portion 69 prevents the bolt 41 returning under the force of the compression spring 49. Because the bolt 41 can be locked in its withdrawn portion, no manual operation of the locking assembly 15 is required during unloading.

Figure 6:
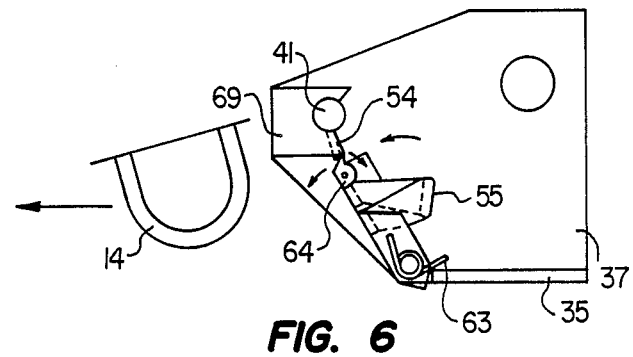
FIGS. 6 through 8 are representation of part of the device at various stages during operation.

As the boat is removed from the trailer, the spring 63 rotates the trigger member 55 anti-clockwise as shown in FIG. 6. The cam 64 comes into contact with the flange 54. This contact rotates the cam 64 and allowing the cam surface 66 to pass the flange 54 and reach the position shown in FIG. 7. Thereafter, the spring 67 returns the cam to its original rotational position.

Figure 7:
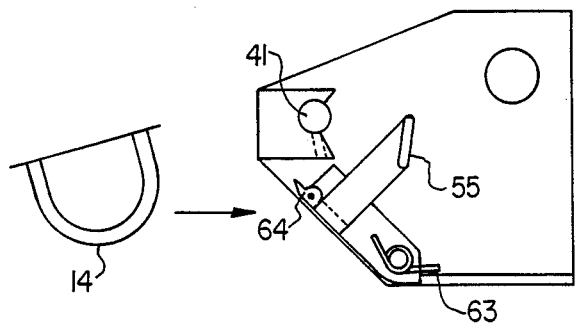
Figure 8:
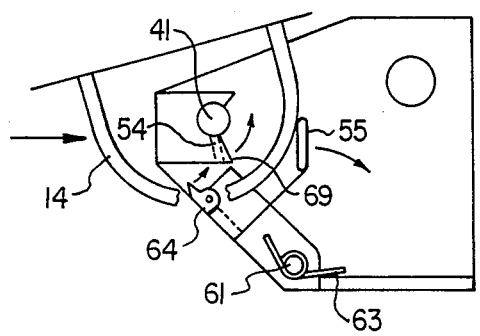

FIG. 7 illustrates the condition of the locking assembly 15 when the boat is off the trailer and the assembly is set to receive the incoming boat. As will be appreciated, the bolt 41 is looked in its withdrawn position prior to use and no manual operation is required during the locking procedure. As the boat approaches the locking assembly 15 it is guided by the guide members 32 of the trailer and/or the rubber roller 25 into the correct position with respect to the locking assembly 15. The assembly 15 remains in its withdrawn condition until the bow eye 14 strikes the trigger member 55. As shown in FIG. 8, when this occurs, the bow eye 14 forces the trigger member 55 to rotate clockwise about the shafts 61, bringing the cam 64 into contact with the flange 54. The cam 64 is not free to rotate in the clockwise direction of FIG. 8, and as the ratchet tooth 68 of the cam 64 engages the flange 54 it rotates the bolt 41 about its axis. As this occurs, the flange 54 ceases to engage with the return portion 69, freeing the bolt 41 for axial movement. The bolt 41 is then forced forward by compression spring 49 passing through the openings 47 and securing the bow eye 14 to the trailer.

I claim:

1. A locking assembly for securing a boat to a trailer by means of the boat's bow eye comprising: a frame mounted on the trailer and carrying a bolt which is movable between a locking position in which it engages, in use, through a bow eye of a boat securing the boat on the trailer and a withdrawn position in which the boat can be removed from the trailer; biasing means urging the bolt towards the locking position; means for restraining the bolt in the withdrawn position; trigger means for releasing the bolt from the restraining means to allow it to move toward the locking position; said trigger means comprising a member on the frame movable from a set position in which it can be contacted by the bow eye of the boat as the boat is loaded on the trailer to release the bolt.

2. A locking assembly according to claim 1 wherein the trigger means comprises a member rotatably mounted on the frame and carrying a cam arranged to disconnect the restraining means when the trigger means is moved from its set position.

3. A locking assembly according to claim 1 wherein said bolt is rotatable about its longitudinal axis when in its withdrawn position to engage said restraining means.

4. A locking assembly according to claim 3 wherein said bolt includes a radially extending flange which, in use, is contacted by said trigger means when said trigger means is actuated to release said restraining means by rotating said bolt about its longitudinal axis.

5. A locking assembly for securing a boat to a trailer by means of the boat's bow eye comprising: a U-shaped frame for mounting on a trailer; a movable bolt mounted on the frame and movable axially between a locking and a withdrawn position and rotationally about its axis between a restrained and a free position; biasing means urging the bolt towards the locking position; restraining means preventing the bolt from moving to the locking position when it is in its restrained rotational position; and trigger means on the frame arranged to be engaged by the bow eye and to rotate the bolt from the restrained position to the free position.

6. A locking assembly according to claim 5 wherein the bolt includes a radially extending retaining flange and the trigger means comprises a central portion which is contacted by the bow eye and two offset outer portion by which it is rotatably connected to the frame.

7. A locking assembly according to claim 6 including a cam, rotatably mounted on one of the outer portions of the trigger means, having a surface arranged to move past the retaining flange when the trigger means moves to a set position and a toothed ratchet which engages the flange of the bolt to rotate the bolt when the trigger means operates.

8. A loading assembly according to claim 7 including means for engaging and guiding the boat during loading to bring the bow eye of the boat into contact with the trigger means.

* * * * *